US006952320B1

(12) United States Patent
Pollock et al.

(10) Patent No.: US 6,952,320 B1
(45) Date of Patent: Oct. 4, 2005

(54) VIRTUAL TRACKS FOR REPEATABLE RUNOUT COMPENSATION

(75) Inventors: Brian Pollock, Eden Prairie, MN (US); Alexei H. Sacks, Edina, MN (US); Brian Sudman, Eden Prairie, MN (US); James H. McGlennen, Eden Prairie, MN (US); Reed D. Hanson, Chaska, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 643 days.

(21) Appl. No.: 09/733,405

(22) Filed: Dec. 8, 2000

Related U.S. Application Data

(60) Provisional application No. 60/170,240, filed on Dec. 10, 1999, provisional application No. 60/198,166, filed on Apr. 17, 2000.

(51) Int. Cl.[7] .......................... G11B 5/596; G11B 15/12
(52) U.S. Cl. ..................................... 360/77.04; 360/63
(58) Field of Search .............................. 360/75, 77.04, 360/77.08, 63

(56) References Cited

U.S. PATENT DOCUMENTS

| 3,725,764 A | 4/1973 | Oswald ........................ 318/629 |
| 3,863,124 A | 1/1975 | Pierce et al. ................. 318/638 |
| 3,914,541 A | 10/1975 | Elliott ......................... 178/6.6 |
| 4,030,132 A | 6/1977 | Iftikar et al. .................. 360/78 |
| 4,103,314 A | 7/1978 | Case ............................ 360/78 |
| 4,135,217 A | 1/1979 | Jacques et al. ................ 360/77 |
| 4,149,199 A | 4/1979 | Chick et al. ................... 360/77 |
| 4,217,612 A | 8/1980 | Matla et al. ................... 360/78 |
| 4,314,295 A | 2/1982 | Frandsen ..................... 360/106 |
| 4,329,712 A | 5/1982 | Lang ........................ 358/128.5 |
| 4,355,266 A | 10/1982 | Pearson ....................... 318/85 |
| 4,371,960 A | 2/1983 | Kroiss ......................... 369/43 |
| 4,396,961 A | 8/1983 | Prasad et al. .................. 360/78 |
| 4,414,589 A | 11/1983 | Oliver et al. .................. 360/77 |
| 4,456,934 A | 6/1984 | Wedman et al. ............... 360/78 |
| 4,485,418 A | 11/1984 | Bremmer ...................... 360/77 |
| 4,497,047 A | 1/1985 | Fujiie et al. ................... 369/45 |
| 4,513,333 A | 4/1985 | Young et al. .................. 360/77 |
| 4,524,397 A | 6/1985 | Chalmers et al. .............. 360/75 |
| 4,562,494 A | 12/1985 | Bond ........................... 360/75 |
| 4,575,776 A | 3/1986 | Stephens et al. ............... 360/78 |
| 4,605,977 A | 8/1986 | Matthews .................... 360/103 |
| 4,616,276 A | 10/1986 | Workman ..................... 360/77 |
| 4,620,244 A | 10/1986 | Krause ........................ 360/77 |
| 4,620,252 A | 10/1986 | Bauck et al. ................. 360/106 |

(Continued)

FOREIGN PATENT DOCUMENTS

| DE | 3900683 A | 1/1989 |
| WO | WO 91/06096 | 5/1991 |
| WO | WO 93/06595 | 4/1993 |
| WO | WO 97/45833 | 12/1997 |

(Continued)

OTHER PUBLICATIONS

*Recording Properties of Multilayered Thin Film Media*, by D.C. Palmer, K.E. Johnson, E.Y. Wu, and J.V. Peske, IEEE Transactions On Magnetics, vol. 27, No. 6, Nov. 1991, pp. 5307-5309.

(Continued)

*Primary Examiner*—Andrew L. Sniezek

(57) ABSTRACT

The present invention relates to repeatable runout (RRO) compensation of servo control systems that can be used in disc drives or spin-stands. The RRO relates to eccentricity between servo tracks, which were written onto a disc prior to the installation of the disc into the disc drive or spin-stand, and an axis of rotation of the disc. The present invention compensates the servo control loop by canceling the RRO and controlling a head to follow virtual tracks which are eccentric to the data tracks defined by the servo tracks and concentric with the axis of rotation of the disc.

8 Claims, 11 Drawing Sheets

U.S. PATENT DOCUMENTS

| | | | | |
|---|---|---|---|---|
| 4,633,345 | A | 12/1986 | Keener | 360/77 |
| 4,636,885 | A | 1/1987 | Yamada et al. | 360/78 |
| 4,677,602 | A | 6/1987 | Okano et al. | 369/32 |
| 4,679,103 | A | 7/1987 | Workman | 360/77 |
| 4,697,127 | A | 9/1987 | Stich et al. | 318/561 |
| 4,697,213 | A | 9/1987 | Kitamura | 360/78 |
| 4,706,250 | A | 11/1987 | Patel | 371/39 |
| 4,727,533 | A | 2/1988 | Erbert | 369/112 |
| 4,764,860 | A | 8/1988 | Takao | 369/43 |
| 4,786,990 | A | 11/1988 | Overton et al. | 360/65 |
| 4,788,608 | A | 11/1988 | Tsujisawa | 360/77 |
| 4,791,599 | A | 12/1988 | Hethuin et al. | 364/728.07 |
| 4,803,572 | A | 2/1989 | Haruna et al. | 360/60 |
| 4,816,938 | A | 3/1989 | Cowen et al. | 360/75 |
| 4,822,139 | A | 4/1989 | Yoshizumi | 350/257 |
| 4,878,135 | A | 10/1989 | Makino et al. | 360/78.04 |
| 4,890,172 | A | 12/1989 | Watt et al. | 360/77.04 |
| 4,897,840 | A | 1/1990 | Weiss et al. | 371/40.1 |
| 4,924,165 | A | 5/1990 | Kohno | 318/592 |
| 4,947,272 | A | 8/1990 | Yokozawa | 360/77 |
| 4,956,831 | A | 9/1990 | Sarraf et al. | 369/32 |
| 4,965,782 | A | 10/1990 | Mathews | 369/48 |
| 5,046,060 | A | 9/1991 | Chow et al. | 369/44.32 |
| 5,055,731 | A | 10/1991 | Nihei et al. | 310/309 |
| 5,056,074 | A | 10/1991 | Tateishi et al. | 369/44.28 |
| 5,062,023 | A | 10/1991 | Squire | 360/78.04 |
| 5,073,885 | A | 12/1991 | Ito et al. | 369/44.28 |
| 5,081,552 | A | 1/1992 | Glaser et al. | 360/98.01 |
| 5,089,757 | A | 2/1992 | Wilson | 318/560 |
| 5,122,718 | A | 6/1992 | Sawata | 318/621 |
| 5,146,372 | A | 9/1992 | Cronch et al. | 360/51 |
| 5,155,422 | A | 10/1992 | Sidman et al. | 318/560 |
| 5,161,077 | A | 11/1992 | Jabbari | 360/106 |
| 5,164,863 | A | 11/1992 | Janz | 360/57 |
| 5,185,681 | A | 2/1993 | Volz et al. | 360/77.05 |
| 5,187,620 | A | 2/1993 | Notake et al. | 360/77.04 |
| 5,189,578 | A | 2/1993 | Mori et al. | 360/106 |
| 5,197,058 | A | 3/1993 | Bell, Jr. et al. | 369/44.28 |
| 5,198,948 | A | 3/1993 | Stover et al. | 360/124 |
| 5,204,793 | A | 4/1993 | Plonczak | 360/97.01 |
| 5,216,559 | A | 6/1993 | Springer | 360/106 |
| 5,233,487 | A | 8/1993 | Christensen et al. | 360/77.04 |
| 5,241,433 | A | 8/1993 | Anderson et al. | 360/77.04 |
| 5,247,501 | A | 9/1993 | Hashimoto et al. | 369/44.11 |
| 5,257,149 | A | 10/1993 | Meyer | 360/78.14 |
| 5,270,885 | A | 12/1993 | Satoh et al. | 360/77.04 |
| 5,274,511 | A | 12/1993 | Ikeda | 360/55 |
| 5,287,225 | A | 2/1994 | Sukigara | 360/106 |
| 5,287,234 | A | 2/1994 | Suzuki | 360/78.04 |
| 5,299,026 | A | 3/1994 | Vincett et al. | 358/401 |
| 5,303,105 | A | 4/1994 | Jorgenson | 360/106 |
| 5,305,160 | A | 4/1994 | Funches et al. | 360/78.07 |
| 5,311,378 | A | 5/1994 | Williams et al. | 360/77.03 |
| 5,367,513 | A | 11/1994 | Bates et al. | 369/44.29 |
| 5,379,171 | A | 1/1995 | Morehouse et al. | 360/10.5 |
| 5,400,201 | A | 3/1995 | Pederson | 360/135 |
| 5,404,253 | A | 4/1995 | Painter | 360/77.04 |
| 5,416,658 | A | 5/1995 | Sega et al. | 360/106 |
| 5,444,582 | A | 8/1995 | Suzuki | 360/78.09 |
| 5,444,583 | A | 8/1995 | Ehrlich et al. | 360/78.09 |
| 5,455,724 | A | 10/1995 | Suzuki et al. | 360/77.04 |
| 5,465,182 | A | 11/1995 | Ishikawa | 360/75 |
| 5,465,183 | A | 11/1995 | Hattori | 360/78.9 |
| 5,521,773 | A | 5/1996 | Suzuki et al. | 360/77.04 |
| 5,521,778 | A | 5/1996 | Boutaghou et al. | 360/106 |
| 5,523,902 | A | 6/1996 | Pederson | 360/77.8 |
| 5,535,072 | A | 7/1996 | Witt et al. | 360/99.06 |
| 5,539,714 | A | 7/1996 | Andres, Jr. et al. | 369/44.26 |
| 5,541,784 | A | 7/1996 | Cribbs et al. | 360/75 |
| 5,550,685 | A | 8/1996 | Drouin | 360/77.08 |
| 5,553,086 | A | 9/1996 | Sompel et al. | 371/47.1 |
| 5,574,354 | A | 11/1996 | Kohchi | 320/109 |
| 5,576,909 | A | 11/1996 | Dierkes et al. | 360/78.09 |
| 5,585,976 | A | 12/1996 | Pham | 360/77.04 |
| 5,602,689 | A | 2/1997 | Kadlec et al. | 360/78.04 |
| 5,608,586 | A | 3/1997 | Sri-Jayantha et al. | 360/77.04 |
| 5,610,487 | A | 3/1997 | Hutsell | 318/560 |
| 5,610,777 | A | 3/1997 | Dang et al. | 360/77.03 |
| 5,617,388 | A * | 4/1997 | Ishioka et al. | 369/44.28 |
| 5,638,230 | A | 6/1997 | Kadlec | 360/78.04 |
| 5,646,797 | A | 7/1997 | Kadlec et al. | 360/75 |
| 5,648,738 | A | 7/1997 | Welland et al. | 327/307 |
| 5,675,450 | A | 10/1997 | Kadlec | 360/78.09 |
| 5,677,809 | A | 10/1997 | Kadlec | 360/78.09 |
| 5,680,272 | A | 10/1997 | Kadlec et al. | 360/78.04 |
| 5,684,650 | A | 11/1997 | Kadlec et al. | 360/77.06 |
| 5,706,265 | A | 1/1998 | Bang | 369/50 |
| 5,708,581 | A | 1/1998 | Martinez | 364/164 |
| 5,774,294 | A | 6/1998 | Fioravanti | 360/75 |
| 5,774,297 | A | 6/1998 | Hampshire et al. | 360/77.04 |
| 5,777,816 | A | 7/1998 | Hampshire et al. | 360/77.08 |
| 5,793,559 | A | 8/1998 | Shepherd et al. | 360/78.09 |
| 5,796,535 | A | 8/1998 | Tuttle et al. | 360/51 |
| 5,796,542 | A | 8/1998 | Szeremeta | 360/77.02 |
| 5,815,332 | A | 9/1998 | Suzuki et al. | 360/48 |
| 5,822,147 | A | 10/1998 | Kisaka | 360/77.08 |
| 5,825,578 | A | 10/1998 | Shrinkle et al. | 360/77.08 |
| 5,826,338 | A | 10/1998 | Chilton et al. | 30/90.1 |
| 5,828,515 | A | 10/1998 | Kim | 360/78.06 |
| 5,835,300 | A | 11/1998 | Murphy et al. | 360/77.05 |
| 5,835,302 | A | 11/1998 | Funches et al. | 360/78.07 |
| 5,844,743 | A | 12/1998 | Funches | 360/78.04 |
| 5,854,722 | A | 12/1998 | Cunningham et al. | 360/77.04 |
| 5,883,749 | A | 3/1999 | Park | 360/75 |
| 5,886,846 | A | 3/1999 | Pham et al. | 360/78.04 |
| 5,898,286 | A | 4/1999 | Clare et al. | 318/569 |
| 5,926,338 | A | 7/1999 | Jeon et al. | 360/77.04 |
| 5,940,239 | A | 8/1999 | Lee et al. | 360/77.02 |
| 5,940,240 | A | 8/1999 | Kupferman | 360/77.08 |
| 5,949,605 | A | 9/1999 | Lee et al. | 360/77.04 |
| 5,949,608 | A | 9/1999 | Hunter | 360/78.09 |
| 5,956,201 | A | 9/1999 | Pham et al. | 360/78.09 |
| 5,969,494 | A | 10/1999 | Kang | 318/610 |
| 5,978,169 | A | 11/1999 | Woods | 360/77.04 |
| 6,069,764 | A | 5/2000 | Morris et al. | 360/77.04 |
| 6,097,565 | A | 8/2000 | Sri-Jayantha et al. | 360/78.09 |
| 6,115,203 | A | 9/2000 | Ho et al. | 360/77.04 |
| 6,128,153 | A * | 10/2000 | Hasegawa et al. | 360/77.08 |
| 6,130,797 | A * | 10/2000 | Akagi et al. | 360/77.04 |
| 6,141,175 | A | 10/2000 | Nazarian et al. | 360/77.04 |
| 6,166,875 | A * | 12/2000 | Ueno et al. | 360/77.04 |
| 6,310,742 | B1 | 10/2001 | Nazarian et al. | 360/77.04 |

FOREIGN PATENT DOCUMENTS

| | | |
|---|---|---|
| DE | 197 15 678 A1 | 10/1997 |
| EP | 0 130 248 A1 | 1/1985 |
| EP | 0 540 114 A1 | 5/1993 |
| EP | 0 549 814 A1 | 7/1993 |
| GB | 2 060 217 A | 4/1981 |
| GB | 1713268 | 3/1991 |

OTHER PUBLICATIONS

*Evolution of The Soft Error Rate Model*, by P. Hardy and D.J. Malone, IEEE Transactions On Magnetics, vol. 27, No. 6, Nov. 1991, pp. 5313-5315.

*Error Rate Performance of Experimental Gigabit Per Square Inch Recording Components*, by T.D. Howell, D.P. McCown, T.A. Diola, Y. Tang, K.R. Hense, and R.L. Gee, IEEE Transactions On Magnetics, vol. 26, No. 5, Sep. 1990, pp. 2298-2302.

*A Track Density Model for Magnetoresistive Heads Considering Erase Bands*, by J.K. Lee and P.I. Bonynard, IEEE Transactions On Magnetics, vol. 26, No. 5, Sep. 1990, pp. 2475-2477.

*Demonstration Of 500 Megabits Per Square Inch With Digital Magnetic Recording*, by Roy A. Jensen, Joost Mortelmans, and Robin Hauswitzer, IEEE Transactions On Magnetics, vol. 26, No. 5, Sep. 1990, pp. 2169-2171.

*IBM's Next Generation Magnetoresistive Heads*, 1987.

*Magnetoresistive Read Magnetic Recording Head Offtrack Performance Assessment*, by P.I. Bonyhard and J.K. Lee, IEEE Transactions On Magnetics, vol. 26, Nov. 1990, pp. 2448-2450.

*Design Issues For Practical Rigid Disk Magnetoresistive Heads*, by P.I. Bonyhard, IEEE, Transactions On Magnetics, vol. 26, No. 6, Nov. 1990, pp. 3001-3003.

*TMR and Squeeze at Gigabit Areal Densities*, by Patrick C. Arnett and Don McCown, IEEE Transactions On Magnetics, vol. 28, No. 4, Jul. 1992, pp. 1984-1986.

*Window-Shifting Mechanism In Data Separator*, IBM Technical Disclosure Bulletin, vol. 30, No. 6, Nov. 1987.

U.S. Appl. No. 60/170,240 entitled "Virtual Tracks for Repeatable Runout (RRO) Management", filed Dec. 10, 1999.

U.S. Appl. No. 60/198,166, entitled Eccentric Servo Track Referencing, filed Apr. 17, 2000.

"Automated Tuning Concepts for Iterative Learning and Repetitive Control Laws" by R. Longman et al., *Proceedings of the 37th IEEE Conference on Decision and Control*, pp. 192-198, (Aug. 1998).

* cited by examiner

FIG. 1.1
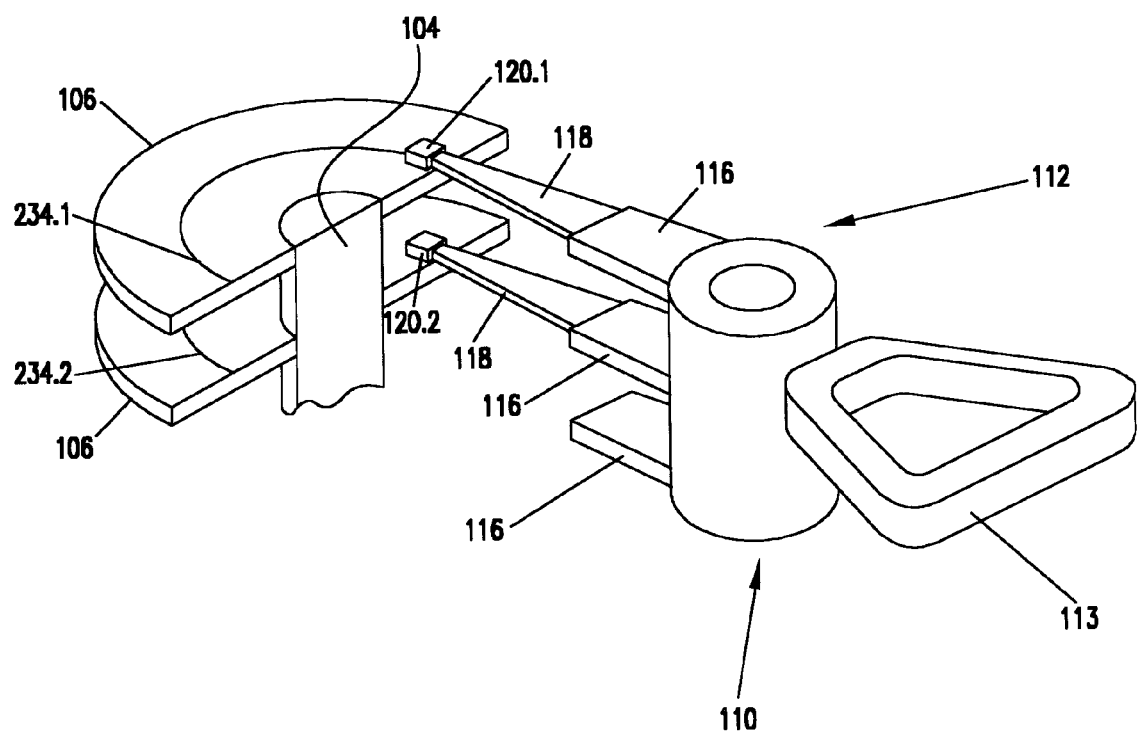

VIRTUAL TRACKS FOR REPEATABLE RUNOUT COMPENSATION

This application claims the benefit of U.S. Provisional Patent Application No. 60/170,240, entitled "VIRTUAL TRACKS FOR REPEATABLE RUNOUT (RRO) MANAGEMENT," filed on Dec. 10, 1999, and U.S. Provisional Patent Application No. 60/198,166, entitled "ECCENTRIC SERVO TRACK REFERENCING," filed on Apr. 17, 2000.

FIELD OF THE INVENTION

The present invention is related to servo systems used to control a position of a head relative to a disc. In particular, the present invention provides compensation for large repeatable runout caused by eccentricity between pre-written servo tracks and an axis of rotation of the disc.

BACKGROUND OF THE INVENTION

Magnetic discs are used in disc drive storage systems for storing digital data and in spin-stands as components on which transducing heads are tested. Disc drives are commonly used in work stations, personal computers, laptops and other computer systems to store large amounts of data on one or more magnetic discs in a form that can be made readily available to a user. The discs are mounted to a spindle motor which rotates the discs at a high speed about an axis. An actuator assembly supports and positions an array of transducing heads over surfaces of the discs to write information to or read information from the discs.

Spin-stands are devices that are used to test transducing heads before they are placed in a disc drive. As in a disc drive, a spin-stand includes a disc that is mounted to a spindle motor which rotates the disc at a high rate of speed about an axis. Also, the spin-stand includes an actuator assembly that supports the head over the disc surface and moves the head to a desired location. The spin-stand allows a series of tests to be performed on the transducing head including, for example, error-rate testing, pulse width-fifty testing, track average amplitude testing, and track scan testing.

The discs used in disc drives and spin-stands generally include circular data tracks which extend circumferentially around each disc. These data tracks are defined by radially extending servo tracks that contain servo information. The servo information defines the boundaries and centerlines of each of the tracks.

Disc drives, and more recently spin-stands, utilize servo systems to control the position of a head relative to the data tracks using the servo information. As a head moves over a surface of a disc, the head reads the servo information and produces an output signal that indicates its position relative to the servo tracks. The output signal is demodulated and compared with a reference position signal relating to a desired head position to produce a position error signal (PES). The PES is provided to a servo controller that produces a control signal which is used to control an actuator mechanisms of the disc drive or spin-stand to move the head toward the desired position or data track. Once the head is positioned over the desired data track, the servo system allows the head to follow the track using the servo information.

The servo tracks are typically written after the discs have been installed in a disc drive or spin-stand with a servo track writer. These "post-written" tracks are substantially concentric with the axis of rotation of the disc on which they are written, since the axis of rotation remains constant from when the servo information is written to when the servo information is used to perform track following. However, uncontrolled factors such as bearing tolerances, spindle resonances, and the like, tend to introduce errors in the location of the servo information. As a result, each track is typically not perfectly concentric with the axis of rotation of the disc, but rather exhibits certain random, repeatable variations which are sometimes referred to as repeatable runout (RRO). This slight misalignment is exhibited in a periodic PES.

There is a continuing trend in the disc drive industry to provide successive generations of disc drive products with ever increasing data storage capacities and data transfer rates. Because the amount of disc surface available for the recording of data remains substantially constant (or even decreases as disc drive form factors become smaller), substantial advancements in areal recording densities, both in terms of the number of bits that can be recorded on each track as well as the number of tracks on each disc (measured as tracks per inch or TPI), are continually being made in order to facilitate such increases in data capacity. One way to improve storage capacities is to improve the writing of the servo patterns on the discs. To this end, servo information is written on the discs prior to their installation in a disc drive or on a spin-stand using highly precise servo writers.

Although these "pre-written" tracks can result in an increase in the TPI of the disc, large RRO will result due to large eccentricity between the data tracks and the axis of rotation of the disc. This eccentricity primarily stems from the re-mounting of the disc to the spindle motor of the disc drive or spin-stand. In addition, the RRO that affects disc drives and spin-stands using post-written discs will also be present when these pre-written discs are used. However, the RRO correction methods mentioned above are not suitable for compensating a PES corresponding to the large RRO resulting from the use of discs having pre-written servo tracks. This is due, in part, to the large sinusoidal current that would have to be injected into the PES to compensate the large adjustments to the position of the head that would be necessary to follow a particular data track as defined by the pre-written servo tracks.

The present invention addresses these and other problems, and offers other advantages over the prior art.

SUMMARY OF THE INVENTION

The present invention relates to repeatable runout (RRO) compensation of servo control systems used in disc drives and spin-stands. One embodiment of the invention is directed toward a servo control loop that includes compensation circuitry having a compensation signal that is generated based upon a compensation equation. The compensation signal represents RRO caused by eccentricity between pre-written servo tracks and an axis of rotation of a disc on which they are written. The compensation signal is injected into the servo control loop to compensate the RRO.

Another embodiment of the invention is directed toward a method of compensating RRO in a servo control loop that is related to eccentricity between pre-written servo tracks on a disc and a path followed by a head that is concentric with an axis of rotation of the disc. In the method a compensation equation is formed that represents the RRO. A compensation signal is generated based upon the compensation signal. The compensation signal is injected into the servo control loop to cancel the RRO and cause the head to follow a virtual track that is concentric with the axis of rotation of a disc.

BRIEF DESCRIPTION OF THE DRAWINGS

FIG. 1.1 is a perspective view of a portion of a disc drive in accordance with an embodiment of the invention.

DETAILED DESCRIPTION OF ILLUSTRATIVE EMBODIMENTS

The present invention relates to compensation of servo control systems used in disc drives and spin-stands for large repeatable runout (RRO). The large RRO results from pre-written servo tracks which define data tracks that are eccentric to an axis of rotation of the disc on which they are written. The present invention overcomes problems presented by the large RRO by compensating the servo control loop to control a transducing head to follow "virtual" tracks which coincide with the axis of rotation of the disc, but are eccentric to the "real" data tracks defined by the pre-written servo tracks. Consequently, the present invention allows a disc drive or a spin-stand to utilize discs having pre-written servo patterns, which can result in an increase in storage capacity and better testing of transducing heads and their supporting mechanisms.

Figure 1:
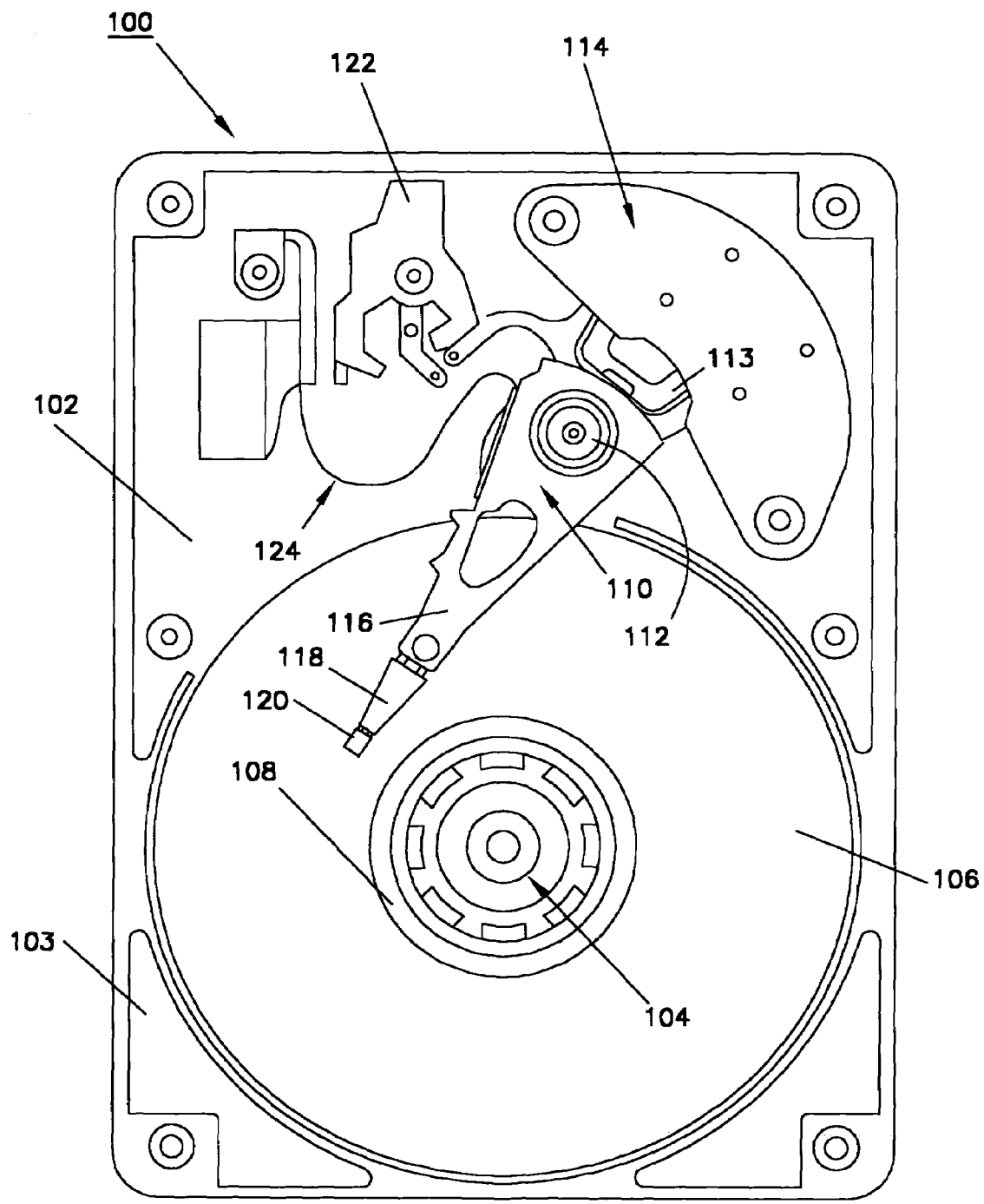
FIG. 1 is a plan view of a disc drive in accordance with an embodiment of the invention.

FIG. 1 shows a top plan view of a disc drive 100 with which aspects of the present invention may be used. Disc drive 100 includes a housing with a base plate 102 to which various disc drive components are mounted. A cover (not shown) generally attaches to base plate 102 to form a sealed environment for the disc drive component. Discs 106 are attached to spindle 104 using clamp 108. Each disc 106 includes servo patterns used to define data tracks, which were written prior to the installation of discs 106 on spindle 104. A spindle 10 motor (not shown) is adapted to rotate spindle 104 and discs 106 at a desired speed.

Actuator assembly 110 is mounted to base plate 102 for rotation about a cartridge bearing assembly 112. Actuator assembly 110 is adapted to rotate in response to a control current supplied to coil 113 of voice coil motor 114. Actuator assembly 110 typically includes a plurality of rigid track accessing arms 116 which extend into the stack of discs 106, as shown in FIG. 1.1. Each of the arms 116 includes an associated flexible suspension assembly 118 extending therefrom. Transducing heads 120 are fixed to each of the suspension assemblies 118. In a typical disc drive 100, there is one head per disc surface, but for purposes of clarity, only two heads 120.1 and 120.2 are shown in FIG. 1.1. Heads 120 each include a transducer that magnetically interacts with the disc recording surfaces, and a slider assembly that supports the head 120 upon an air bearing established by wind currents set up by the high speed rotation of disc 106. A latch assembly 122 can be used to secure actuator assembly 110 when disc drive 100 is deactivated. Flex circuit assembly 124 enables heads 120 and coil 113 to electrically communicate with disc drive control circuitry (not shown) on a printed circuit board mounted to the under side of base plate 102.

Figure 2:
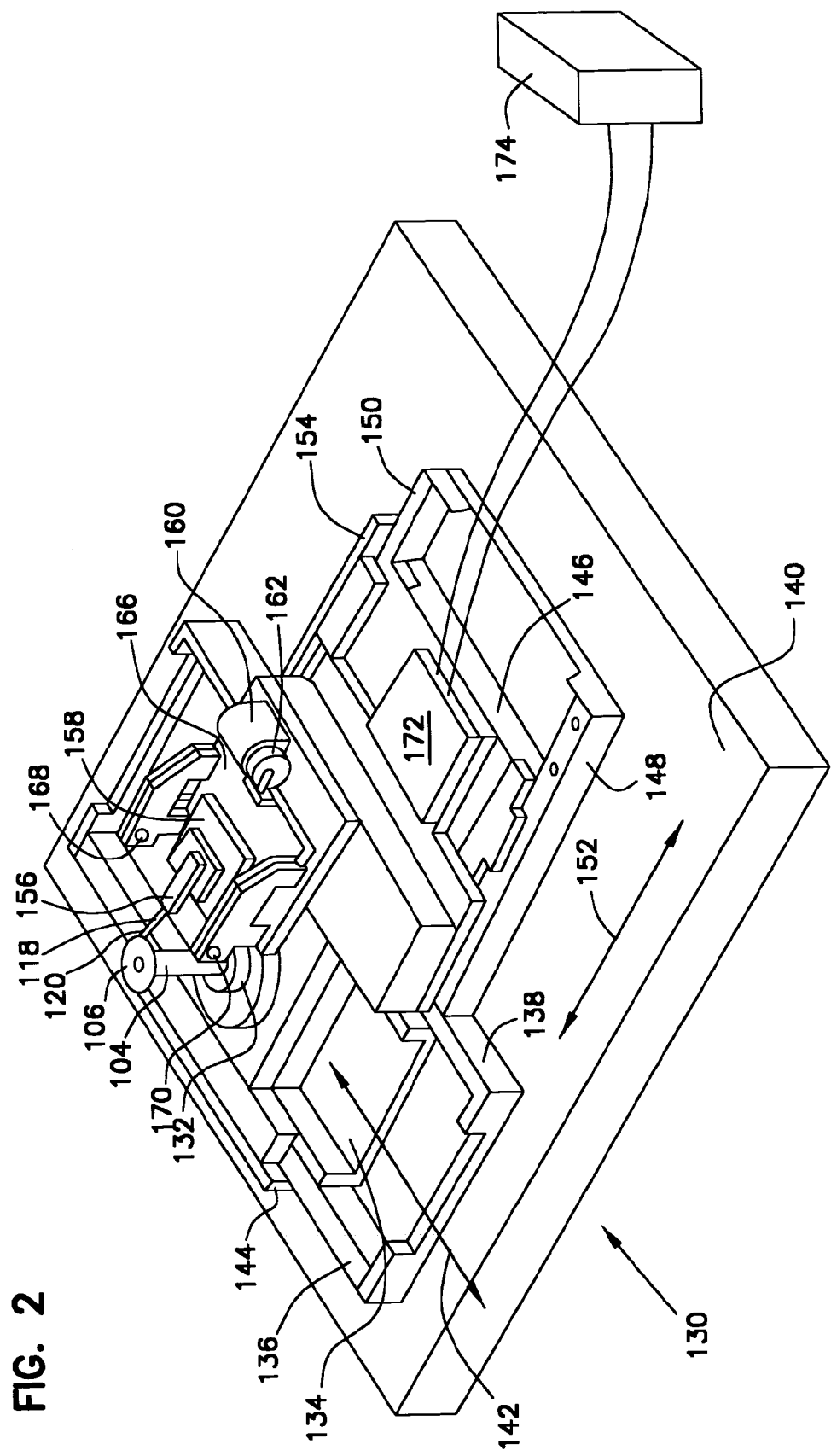
FIG. 2 is a perspective view of a spin-stand in accordance with an embodiment of the invention.

FIG. 2 is a perspective view of an example of a spin-stand 130 in which the large RRO compensation provided by the present invention can be used. Components in FIG. 2 which are the same or similar to the components identified with reference to disc drive 100 (FIG. 1) are identified by the same numbers in FIG. 2. Spin-stand 130 includes a disc 106 which is mounted on spindle 104 and rotated by spindle motor 132. Spindle motor 132 rests on platform 134 which moves between guide rails 136 and 138. Platform 134 can be supported by a cushion of air during movement and can be stabilized in a particular position by the application of a vacuum between platform 134 and granite face 140 located directly below platform 134. For purposes of reference, movement of platform 134 along guide rails 136 and 138 is considered to be in the "X" direction as shown by arrows 142. A position encoder 144 can be located, for example, along guide 136 to provide an indication of the position of platform 134.

Spin-stand 130 also includes a carriage 146 that moves between rails 148 and 150 in the "Y" direction as indicated by arrows 152. Similar to platform 134, carriage 146 can be supported by a cushion of air during movement and can be locked into position by applying a vacuum between carriage 146 and granite base 140. A position encoder 154 can be located, for example, along guide 150 to provide an indication of the position of carriage 146.

Carriage 146 and platform 134 both move using electromotive motors mounted between one of the guide rails and the respective platform or carriage. Other types of motors, such as a stepper motor, may be used in place of the electromotive motors. These motors generally perform coarse adjustment of a suspension assembly 118, which is connected to a suspension chuck 156 and supports a transducing head 120 proximate a surface of disc 106. In one embodiment, suspension chuck 156 is connected to piezo platform 158 through piezo elements that are able to move suspension chuck 156, generally in the "X" direction 142, to perform fine adjustment of transducing head 120 relative to disc 106.

During head loading operations, pivot motor 160 rotates eccentric cam 162 causing lever arm 164 and the back end of pivoting platform 166 to rotate upward about pivot pins 168 and 170. Carriage 146 can be moved forward so that transducing head 120, carried at the end of suspension assembly 118, moves under the spinning disc 106. Support platform 134 is also moved so that the head 120 is positioned at a desired radius along discs 106. When head 120 nears the desired location relative to discs 106, motor 160 rotates eccentric cam 162 back so that pivoting platform 166 returns to its level position and the head is brought into proximity with discs 106 so that head 120 can fly over the surface 110 of discs 106.

Head 120 on suspension assembly 118 is connected by electrical leads to printed circuit 172, which has further connections to control box 174. Control circuitry, which is either part of circuit 172 or contained in control box 174, is used to control the positioning of head 120 on suspension assembly 118. The control circuitry for spin-stand 130 can be adapted to move head 120 to a test track on disc 106 which data is to be read from or written to. Additionally, the position of head 120 can be adjusted by the control circuitry to move head 120 to a number of different locations within the test track during readback, so that a profile of head 120 can be determined. Additional circuitry can be used to control the tests that are performed by spin-stand 130, such as error-rate testing, pulse width-fifty testing, track average amplitude testing, and track scan testing, all of which are familiar to those skilled in the art.

Figure 3:
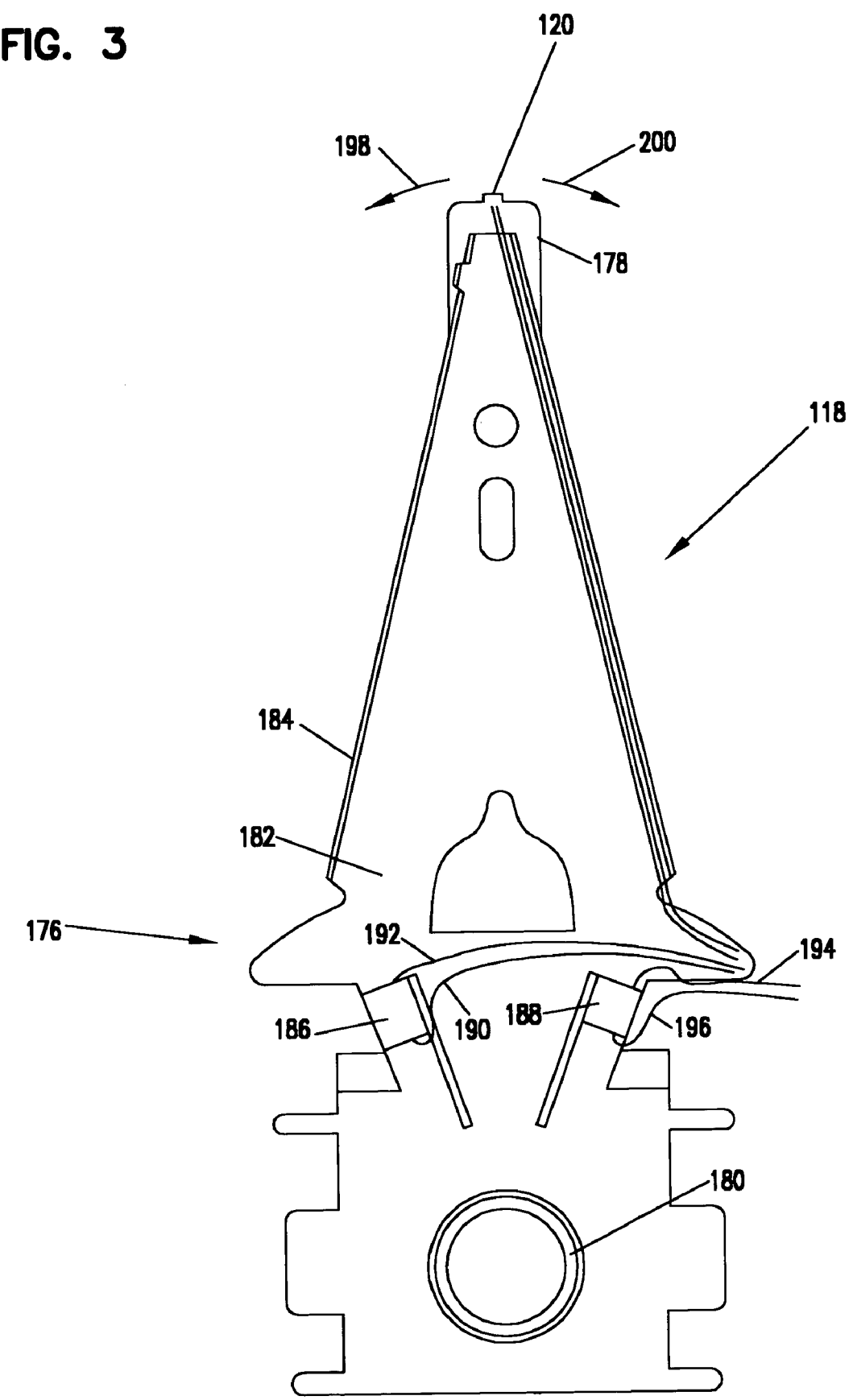
FIG. 3 is a plan view of a suspension assembly in accordance with an embodiment of the invention.

One embodiment of suspension assembly 118, is shown in FIG. 3.

Suspension assembly 118 generally includes load beam 176 and gimbal 178. Load beam 176 has a mounting portion 180 for connecting suspension assembly 118 to a track accessing arm 116 or suspension chuck 156. Flexible beam portion 182 applies a pre-load force to head 120 through rigid beam section 184 to limit the flying height of head 120. Flexible beam portion 182 can also include microactuators 186 and 188 to provide precise control to the position of head 120. In one embodiment, microactuators 186 and 188 are capable of contracting or expanding depending on a voltage applied by respective conducting lines 190, 192, 194, and 196 for fine control of the position of head 120. Microactuator 186 can contract while microactuator 188 expands to move head 120 in direction 198. Likewise, microactuator 188 can contract while microactuator 186 expands to move head 120 in direction 200. Alternative types and configurations of microactuators may be used along suspensions 118 and 194 as is understood by those skilled in the art. For example, multiple microactuators may be used within the same suspension assembly with their movement coordinated by the control circuitry for disc drive 100 and spin-stand 130.

Discs 106 used in disc drive 100 and spin-stand 130 include servo patterns which can be used to establish data tracks on disc 106 and control the position of head 120 relative to disc 106. The servo patterns are typically written to a surface of the disc 106 in a plurality of radially extending servo sectors 202, as shown in the portion of a disc 106 shown in FIG. 4. Each of the servo sector 202 contains servo information that is stored in various servo fields. The servo information identifies the location of "real" data or servo tracks, such as servo track 204, by a track number or track ID. Tracks 204 are typically sequentially numbered in accordance with their radial position where track zero is located adjacent an inner diameter (ID) of disc 106 and a last track is located adjacent an outer diameter (OD) of disc 106. An example of a portion of a data track 204, shown in FIG. 5, includes data areas 206, interspersed between servo sectors 202, in which user data can be stored in a conventional manner.

In addition, the servo information includes servo track identifying information in the form of an index sector 207 which can be used to determine a relative angular position of the servo track. Consequently, the servo information provides coarse position information in terms of a track number (radial position) and an index sector 207 (angular position). Additionally, the servo sectors 202 can provide fine position information using known patterns, such as a split-burst servo pattern or a null-type servo pattern to indicate the location of a head 120 relative to a center of a given data track 204.

A servo control loop provides control of the position of head 120 relative to servo tracks 204 using the servo information and can be configured to carry out two main types of servo operation: seeking and track following. During a typical seek, a head 120 is moved from an initial track to a destination track on the corresponding disc 106. A velocity profile is formulated indicative of a target velocity trajectory for the head 120, with current being applied to the coil 113 to first accelerate and then decelerate the head 120 toward the destination track in accordance with the velocity profile. To maintain the trajectory of the head 120, the current is successively adjusted in relation to the difference between the actual velocity and the target velocity of the head 120.

During a track following mode of operation, the head 120 is caused to follow a corresponding selected data track 204 on the disc 106. The servo information from the track being followed is periodically sampled and provided to a servo controller, which controls the actuator mechanisms used to control the position of head 120 in order to maintain head 120 in a desired relationship to the data track 204.

Figure 4:
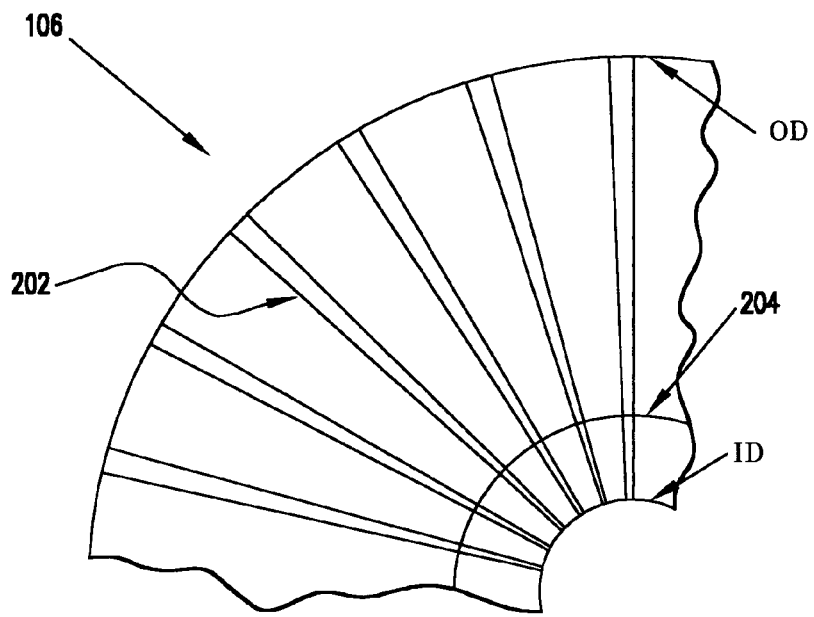
FIG. 4 is a representation of a plurality of servo sectors or wedges on a portion of a disc that can be used in a disc drive or spin-stand.
Figure 5:
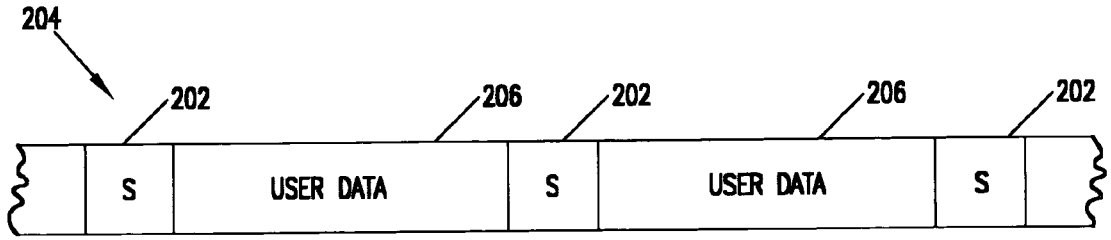
FIG. 5 shows a portion of a data track on the disc as defined by the servo tracks.
Figure 6:
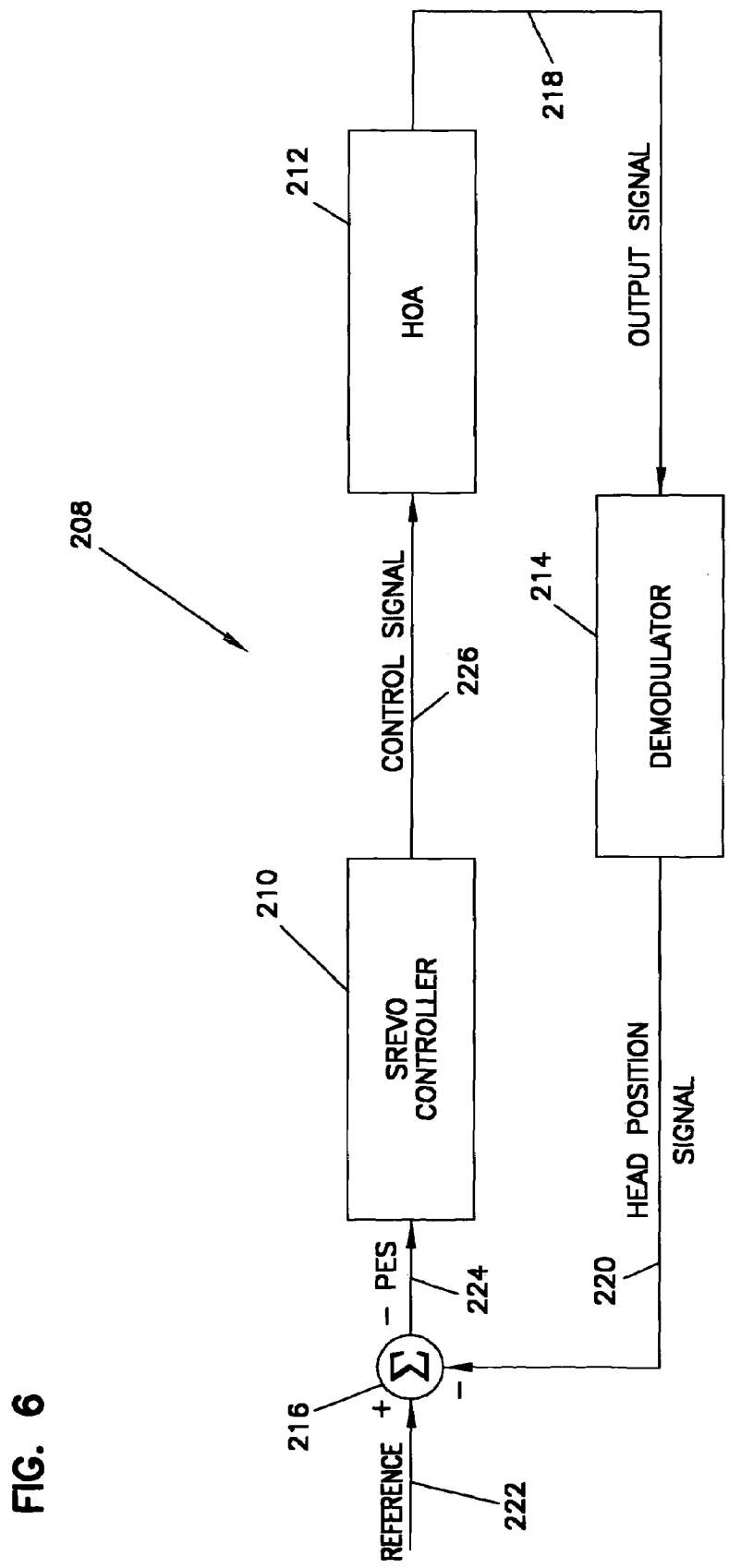
FIG. 6 is a simplified block diagram of a servo control loop that can be used with a disc drive or a spin-stand.

FIG. 6 shows a simplified block diagram of a servo control loop 208, which could be used with disc drive 100 and spin-stand 130 to control the position of head 120 relative to the servo tracks 204 (FIG. 4). Servo control loop 208 includes servo controller 210, head/disc assembly (HDA or "plant") 212, demodulator 214, and summing junction 216. HDA 212 generally includes the actuator mechanisms of disc drive 100 or spin-stand 130 that are used to adjust the position of head 120. Thus, for disc drive 100, the actuator mechanisms include voice coil motor 114 and/or microactuators 186 and 188 of suspension assembly 118, as shown in FIGS. 1 and 3. The actuator mechanisms for spin-stand 130 include the electromotive motors used to move platform 134 and carriage 146, the piezo elements used to move suspension chuck 156, and/or microactuators 186 and 188 of suspension assembly 118, all of which are shown in FIGS. 2 and 3.

As disc 106 is rotated, head 120 of HDA 212 periodically samples servo information contained in the servo sectors 202 and produces an output signal in response thereto on path 218. The servo information (coarse and fine position information) contained in the output signal is demodulated by demodulator 214 and is presented as a head position signal on path 220. The head position signal is provided as an input to summing junction 216, which also receives a reference signal relating to a data track number from path 222 that is indicative of a desired position of head 120. Summing junction 216 compares the reference signal to the head position signal and produces a position error signal (PES) on path 224. The PES relates to a correction in the position of head 120 relative to data tracks 204 that is required to position the head 120 in accordance with location indicated by the reference signal. The PES is provided to servo controller 210, which responds by adjusting a control signal that is provided to HDA 212 along path 226. The control signal causes the actuator mechanisms of HDA 212 to adjust the position of head 120 toward the desired position.

Traditionally, servo sectors 202 (FIG. 4) are written on disc 106 after the disc 106 is installed in a disc drive using a process called servo track writing. The process uses a servo writer that writes the servo information on the disc while it rotates on the spindle within the disc drive or on the spin-stand. These "post-written" servo tracks are typically concentric with the axis of rotation of the disc and the circular path that a head follows over the surface of disc 106. As a result, the path of a head 120 and the data tracks defined by these post-written servo tracks are substantially concentrically aligned. However, minor and somewhat random repeatable position errors in the servo control loop, known as written-in repeatable runout (RRO), still occur due to small misalignment between the center of track 204 and the circular path of head 120. This misalignment occurs because the write head used to produce the servo tracks does not always follow a perfectly circular path due to unpredictable pressure effects on the write head from the aerodynamics of its flight over the disc, and from vibrations in the head. Consequently, a head that perfectly tracks a data track defined by the servo tracks will not follow a circular path. This RRO, however, can be compensated in the servo control loop using various known methods, which allow a head to follow the written-in data tracks. One such method is taught in U.S. Pat. No. 6,069,764 by Morris et al., which is assigned to the Assignee of the present invention.

Unlike the prior art, the present invention focuses on compensation of RRO in a disc drive or spin-stand that is caused by the use of discs 106 having servo patterns 202 which were written on the discs 106 prior to their installation in a disc drive 100 or spin-stand 130. These "pre-written" servo patterns or sectors 202 make track-following operations more difficult due to substantial eccentricity between the "real" data tracks defined by the servo patterns and a circular path that a head follows. The present invention does not attempt to compensate the RRO to allow the servo control loop to better perform track-following operations. Rather, the compensation (or cancellation) of this large RRO is made to allow a head to follow "virtual" tracks, which are eccentric to servo tracks 204 while being substantially concentric with the axis of rotation of the disc 106 on which they are written.

Figure 7:
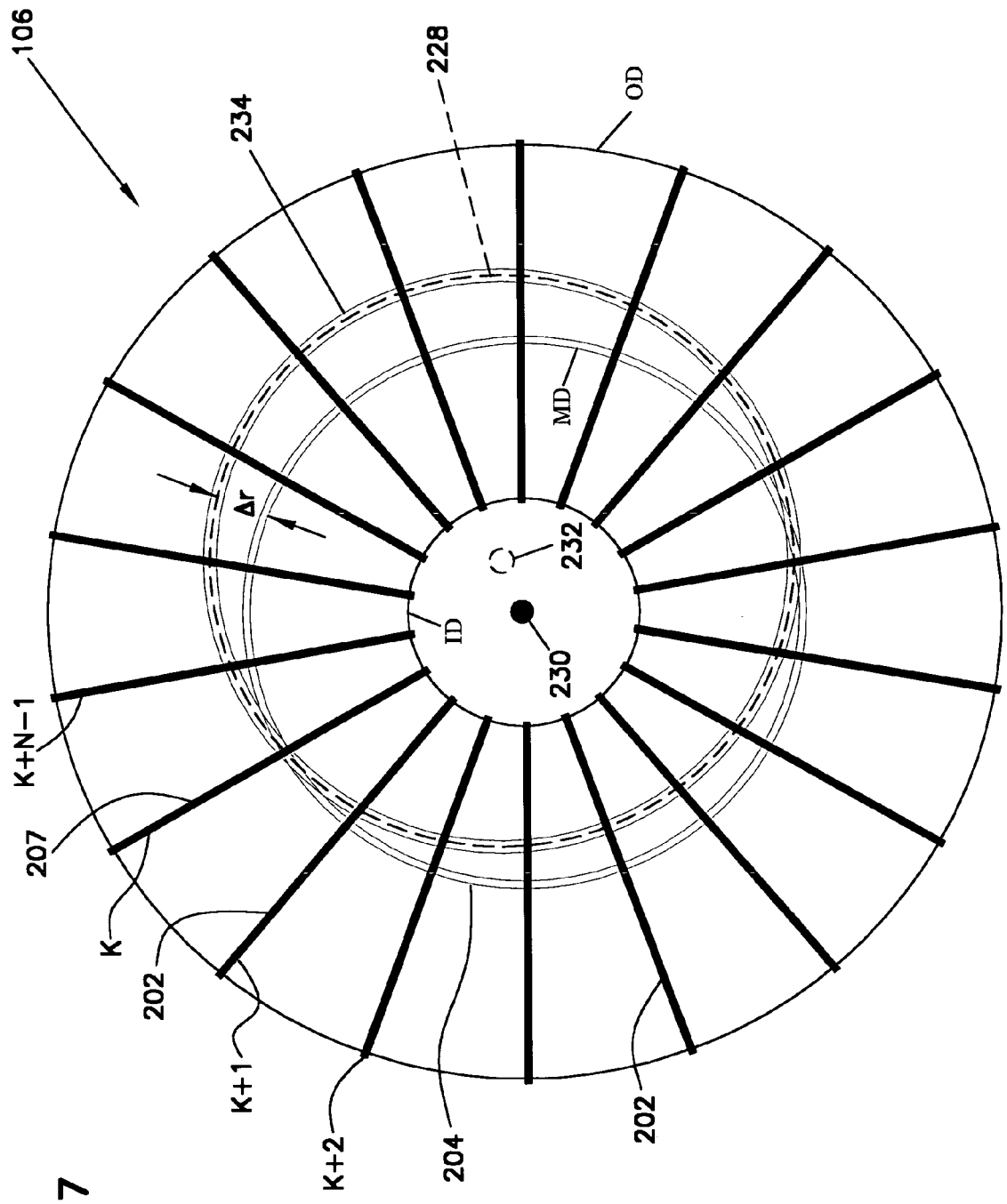
FIG. 7 is a simplified illustration of a disc showing eccentricity between pre-written servo tracks and an axis of rotation of the disc.

FIG. 7 is a simplified illustration of a disc 106 showing the above-described misalignment between data tracks 204 (only one shown) defined by pre-written servo sectors 202 and a path 228 that a head 120 follows as disc 106 rotates. Data tracks 204 are concentric with a servo track axis 230 and path 228 is concentric with axis of rotation 232 of disc 106. A large degree of eccentricity exists between data tracks 204 and path 228 due to the misalignment of servo track axis 230 and axis of rotation 232 when disc 106 is mounted to spindle 104 of either disc drive 100 or spin-stand 130. This misalignment can be in the range of 1000 micro-inches or more, which results in a periodic or sinusoidal RRO that has significantly larger displacement magnitudes than the small and somewhat random RRO associated with discs having post-written servo tracks. This substantial eccentricity between path 228 and tracks 204 makes the above-described traditional track-following operations impractical and, in some instances, impossible due to the large position changes of head 120 that would be required.

As mentioned above, the present invention solves the above-described misalignment problem by establishing "virtual" tracks 234 (only one shown), which are substantially concentrically aligned with the circular path 228 and axis of rotation 232 of disc 106, as illustrated in FIG. 7. This is accomplished by compensating the servo control loop in a disc drive 100 or spin-stand 130 with a compensation signal that eliminates the position errors that would arise during track following operations due to the RRO and causes a head 120 to follow virtual tracks 234. One advantage of the present invention is that a significant amount of energy is conserved by following virtual tracks 234 rather than the written-in tracks. In addition to reducing power consumption, this can also extend the life of a disc drive and spin-stand. Furthermore, many spin-stands and, depending on the amount of RRO, disc drives, do not have a large enough actuation ability to physically track follow the large RRO. Consequently, another advantage of the present invention is that it allows these spin-stands and disc drives to use pre-written discs.

Figure 8:
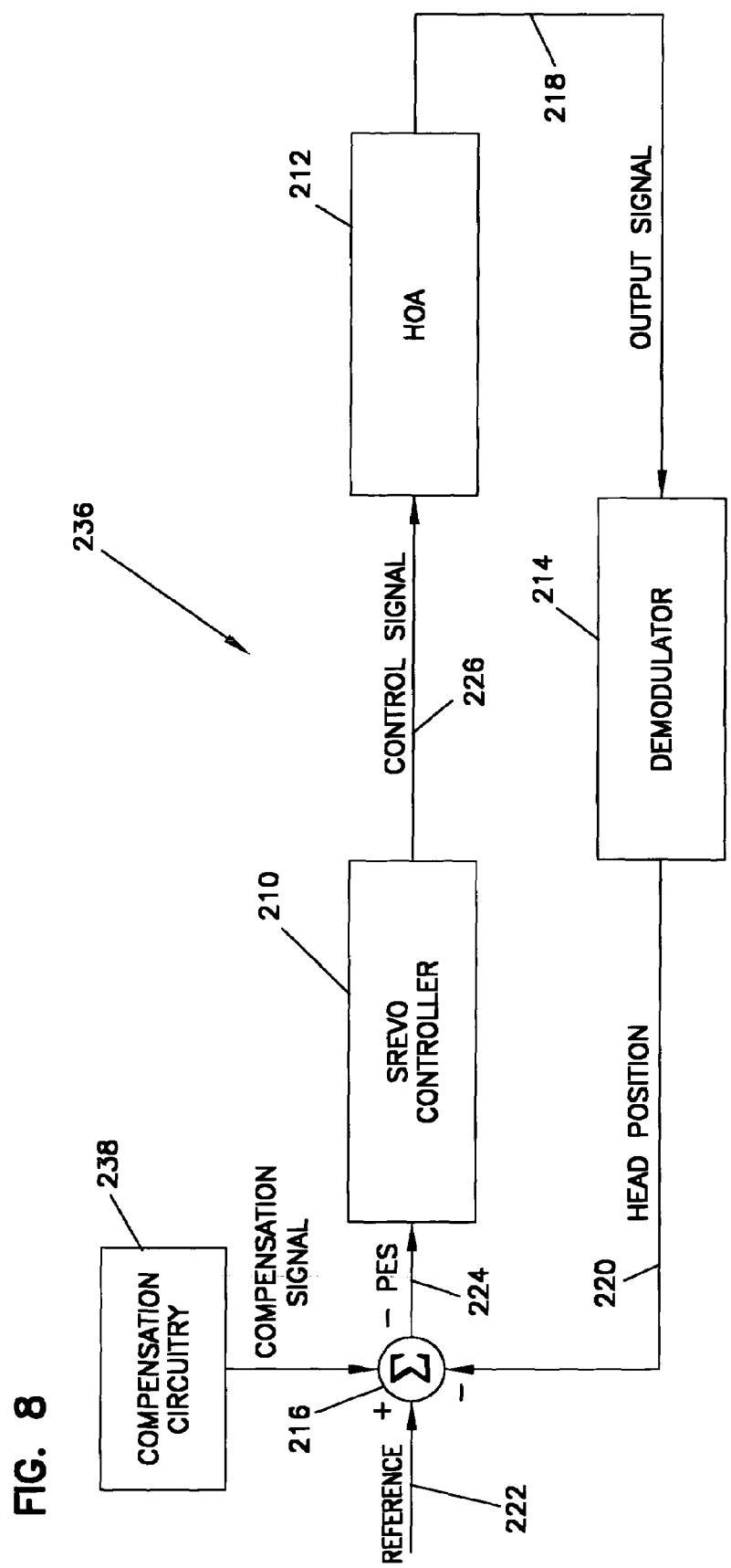
FIG. 8 is a servo control loop for use in a disc drive or a spin-stand in accordance with an embodiment of the invention.

To facilitate an understanding of the present invention, FIG. 8 has been provided as a conceptual representation of a servo control loop 236 during a track following mode of operation in a disc drive 100 or a spin-stand 130. Servo control loop 236 includes the general components found in servo control loop 208 such as servo controller 210, head/disc assembly (HDA or "plant") 212, demodulator 214, and summing junction 216, as described above with reference to FIG. 6. In addition, servo control loop 236 of the present invention includes compensation circuitry 238 which is adapted to inject a compensation signal into servo control loop 236 to provide compensation for the large RRO. The compensation signal is generated based upon a compensation equation that relates to the large RRO produced due to the eccentricity between the pre-written servo tracks 204 and the path 228 of head 120 or the axis of rotation 232 of disc 106. The compensation signal is injected into servo control loop 236 such that it cancels the position error caused by the large RRO thereby controlling head 120 to follow a virtual track 234 that is concentric with axis of rotation 232 of disc 106.

In the embodiment depicted in FIG. 8, the compensation signal is injected along path 240 into summation junction 216 where it is subtracted from the difference between the reference signal and the head position signal which that are provided along paths 222 and 412, respectively. However, compensation circuitry 238 can be configured to inject the compensation signal anywhere along the servo control loop 236 to provide the desired compensation. For example, the compensation signal could be subtracted from the control signal in path 226, the output signal in path 218, or the reference signal in path 222. Alternatively, the compensation signal could be added to the head position signal in path 220 or used in servo controller 210, to provide the desired compensation to servo control loop 236.

The compensation signal is a periodic signal that represents the RRO and has a period relating to integer multiples of the time for one revolution of disc 106. In its basic form, the compensation signal has a period equal to the time for one revolution of disc 106. However, higher frequency components of the compensation signal can be included as well. The amplitude of the compensation signal varies with the angular position and relates to the radial position difference $\Delta r$ between circular path 228 of head 120 and a reference data track 204 as defined by the pre-written servo information, as shown in FIG. 7.

In one embodiment of the invention, the compensation signal is based upon a compensation equation, designated as C, that comprises discrete compensation values set as the radial position difference $\Delta r$ measured at each servo sector 202, as shown in Equation 1. The subscript k represents the sector index 207 and N represents the number of sectors 202. The reference data track 204 from which the radial position difference $\Delta r$ is measured is preferably selected such that the compensation values represent only the RRO rather than the RRO plus a constant offset value. The resulting compensation equation can then be represented as a purely sinusoidal equation having only an periodic or AC component while lacking a constant or DC component. If desired, the values of the compensation equation between adjacent servo sectors can be obtained using known interpolation techniques.

$$C(k) = \begin{pmatrix} \Delta r_k \\ \Delta r_{k+1} \\ \Delta r_{k+2} \\ \vdots \\ \Delta r_{k+N-1} \end{pmatrix} \quad \text{Equation 1}$$

The compensation equation is preferably stored in memory of disc drive 100 or spin-stand 130. The embodiment of the compensation equation represented in Equation 1 is preferably stored as a look-up table in memory where the compensation values Δr are indexed according to their corresponding servo track 202. For disc drive 100 the memory used to store the compensation equation is preferably flash memory, which can be accessed during power on 20 conditions. In spin-stand 130, the memory used to store the compensation equation can be part of the control circuitry.

Figure 9:
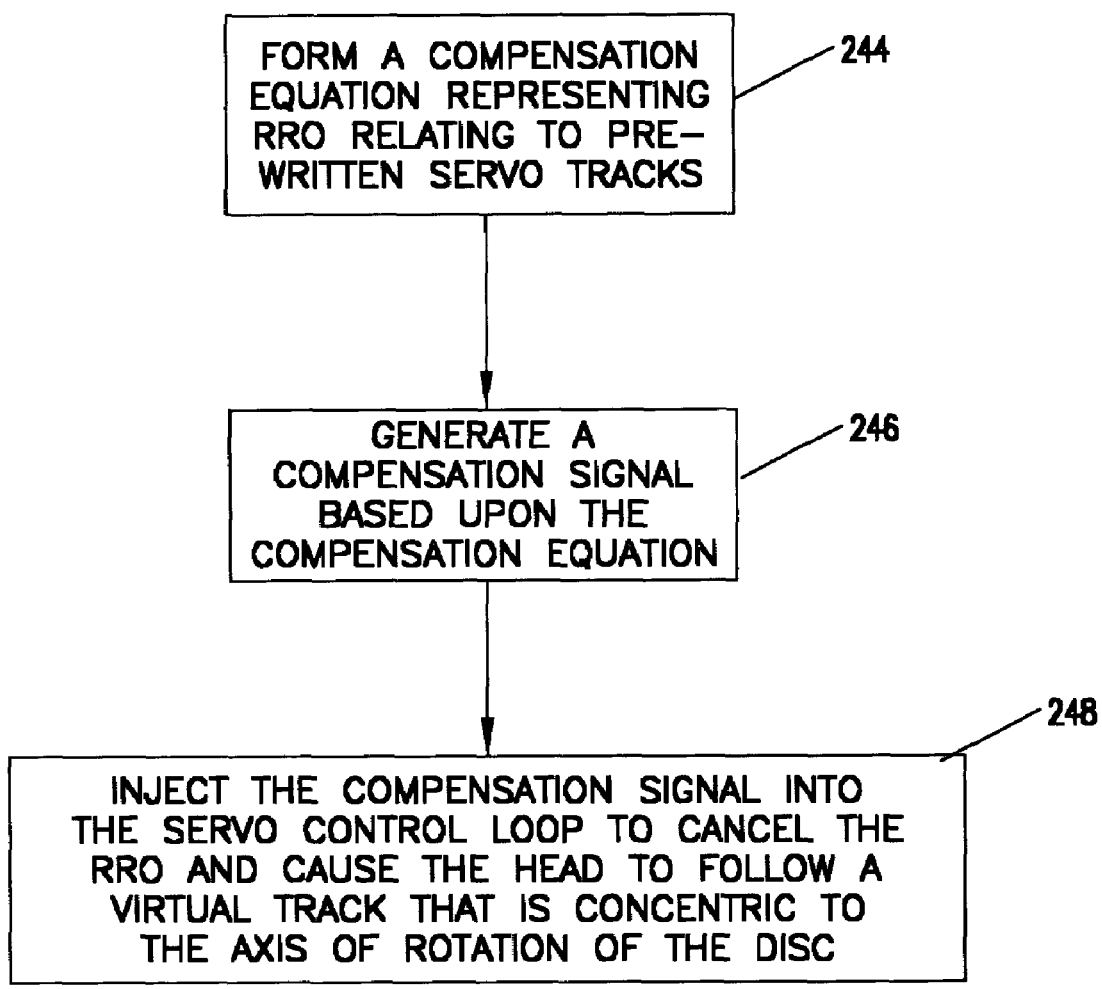
FIG. 9 is a flowchart illustrating a method of compensating large RRO in a servo control loop in accordance with an embodiment of the invention.

FIG. 9 is a flowchart illustrating a method of the present invention of compensating a servo control loop used in either a disc drive 100 or a spin-stand 130 to control the position of a head 120. At step 244, a compensation equation is formed, which relates to a periodic component of RRO caused by eccentricity between pre-written servo tracks 204 and an axis of rotation 232 of disc 106 (FIG. 7). At step 246, a compensation signal is generated based upon the compensation equation. Finally, at step 248, the compensation signal is injected into the servo control loop such that the RRO is cancelled, which causes the head 120 to follow virtual tracks 234 (FIG. 7) which are eccentric to the pre-written servo tracks 204 and are concentric to the axis of rotation 232 of disc 106.

The establishment of virtual tracks 234 on disc 106 also requires that a reference virtual track be established from which the other virtual tracks 234 are displaced. For example, the reference virtual track could be selected as a virtual track zero that is positioned adjacent inner diameter ID of disc 106 (FIG. 7). However, reference virtual track could also be located at other radial positions of disc 106. In addition, it is desirable to maximize the area of disc 106 on which virtual tracks 234 can be established to maximize the storage capacity of disc 106. Here, it is preferable that a first virtual track positioned near inner diameter ID and a last virtual track be positioned as far apart as possible without having a portion of any virtual track 234 lie on an area of disc 106 that is outside the pre-written servo sectors 202.

Figure 10:
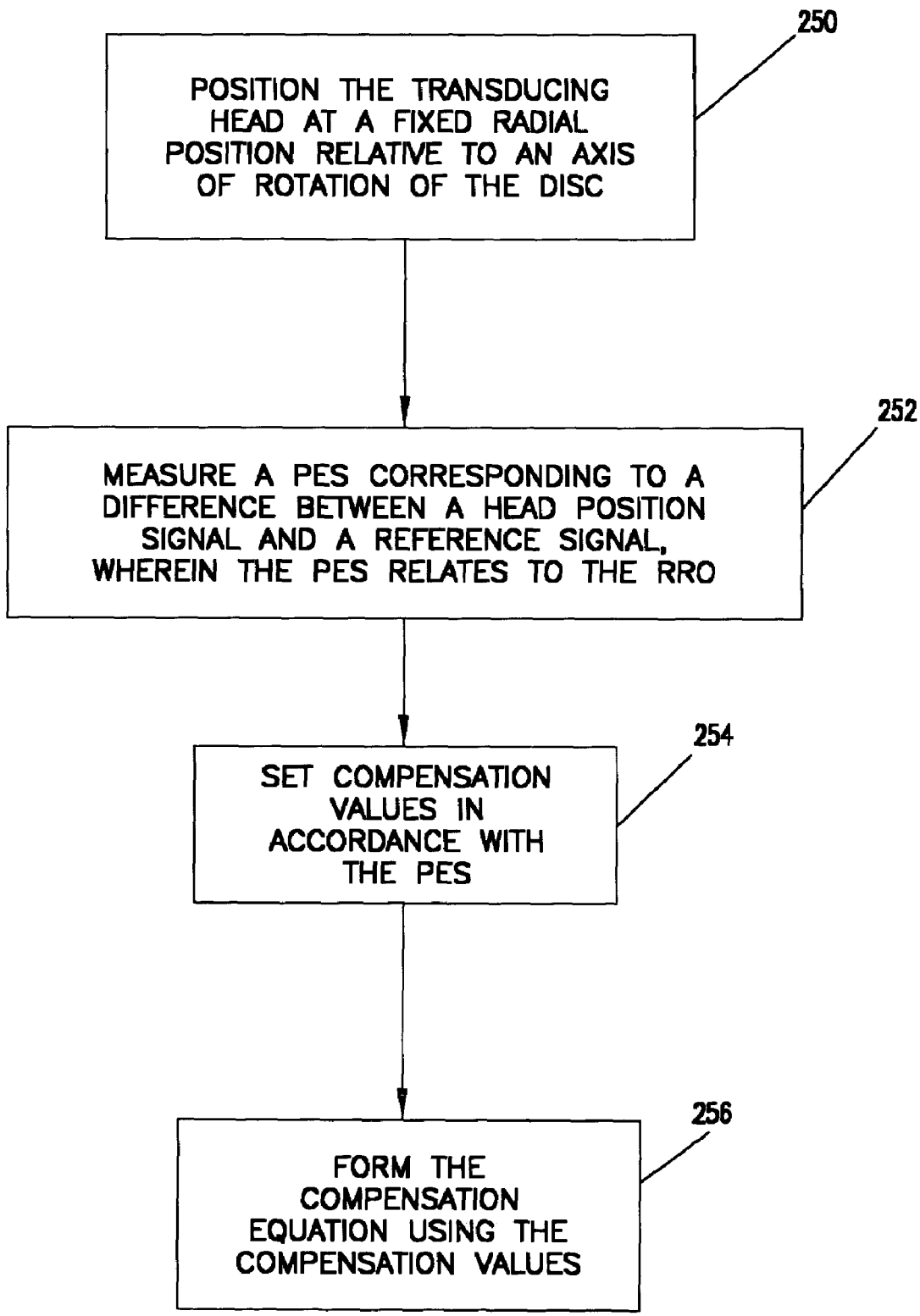
FIG. 10 is a flowchart illustrating of a method of forming a compensation equation in accordance with an embodiment of the invention.
Figure 11:
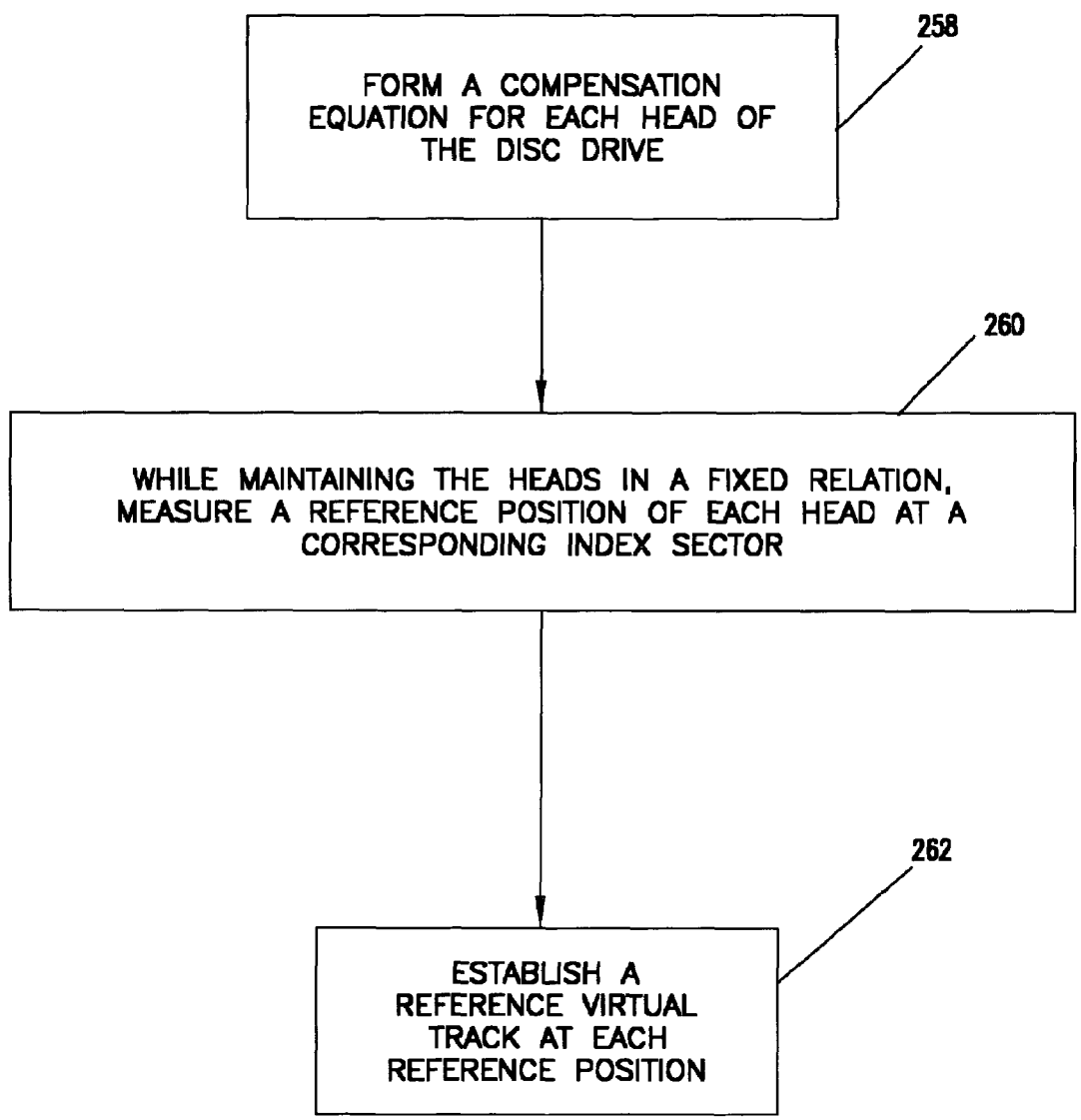
FIG. 11 is a flowchart illustrating a method of compensating a servo control loop of a disc drive in accordance with an embodiment of the invention.

The general method for establishing the compensation values Δr used to form the compensation equation is illustrated in the flowchart of FIG. 10. At step 250, the head 120 is positioned at a fixed radial position relative to axis of rotation 232 of disc 106. The radial position of head 120 can be at any radial position where the pre-written servo sectors 202 can be read, such as an outer diameter OD, a middle diameter MD, or an inner diameter ID, of disc 106 as shown in FIG. 7. In disc drive 100, head 120 can be maintained proximate outer diameter OD of disc 106 by forcing track accessing arm 116 against a crash stop (not shown). Alternatively, if the servo control loop 208 remains closed, a servo controller 210 (FIG. 8) having a low gain could be used to maintain head 120 at the desired radial location. In a spin-stand 130, the head 120 can typically be fixedly positioned relative to disc 106 using a constant control signal.

As discussed above with reference to FIG. 6, head 120 produces an output signal relating to the servo information contained in the pre-written servo sectors 202, which form servo tracks 204 on disc 106. The output signal is converted by demodulator 214 into a head position signal on path 220 of the servo control loop 208. The head position signal is then compared to a constant reference signal at summation junction 216 to produce the PES on path 224. The method illustrated in FIG. 10 continues at step 252 by measuring the PES that is produced on path 224. The measurement of the PES at step 252 is at least measured at the first harmonic or spindle frequency of disc drive 100 or spin-stand 130, but can also be measured at higher harmonics of the spindle frequency. The measured PES relates to the RRO caused by the eccentricity between the pre-written servo tracks 204 and the axis of rotation of disc 106 and will comprise position error values at each servo track 202 that can be used to offset the large RRO in the servo control loop such that head 120 can follow virtual tracks 234 that are concentric with axis of rotation 232 of disc 106. The compensation values Δr are set in accordance with the position error values of the PES, at step 254. Finally, at step 256, the compensation equation is formed using the compensation values Δr. The compensation equation could be formed of the discrete measured compensation values Δr (Equation 1) or a continuous periodic equation can be formed using the compensation values Δr, as mentioned above. Other methods can also be used to establish the desired virtual tracks 234, such as, for example, feed-forward cancellation techniques and zero acceleration path (ZAP) methods.

Disc drive 100, shown in FIGS. 1 and 1.1, typically includes a stack of discs 106, all of which are mounted to spindle 104. Each of the discs 106 includes the above-described pre-written servo tracks 204 and one or two corresponding heads 120 that are adapted to perform reading and writing operations on their respective disc 106. Each of the heads 120 are mounted to actuator assembly 110, as shown in FIG. 1.1, such that the relative position of the heads 120 remains fixed. In one embodiment of the present invention, a compensation equation is formed for each head 120 such that servo control loop controls each head to follow virtual tracks that are concentric to the axis of rotation of the respective disc 106, as in the manner described above.

It is desirable to configure disc drive 100 to operate in a "cylinder" mode where respective virtual tracks of each head are vertically aligned with each other to increase switching efficiency and performance. An example of disc drive 100 operating in a cylinder mode will be described with reference to FIG. 1.1. Here, while a first head 120.1 is tracking a virtual track 234.1 that is identified in the servo control loop as, for example, virtual track one thousand, a second head 120.2 is positioned over a virtual track 234.2 that is also identified as virtual track one thousand. Thus, when operating in this mode, disc drive 100 does not need to move second head 120.2 when switching from first head 120.1 provided that the particular virtual track number that is to be followed has not changed. As a result, disc drive 100 is able to switch between heads 120 quickly when operating in this mode.

One embodiment of the present invention is directed to a method of correlating the virtual tracks associated with each head/disc combination of disc drive 100 to facilitate operating disc drive 100 in a cylinder mode. This can be accomplished using the method illustrated in FIG. 1. At step 258, a compensation equation is formed for each head 120 of disc drive 100 using any of the aforementioned methods. At step 260, while maintaining the heads 120 in a fixed relation, measure a reference position of each head at the corresponding index sector 207 (FIG. 7). At step 262, the measured reference positions are used as the location of a reference virtual track for each head 120, from which all of the other virtual tracks 234 are established. In this manner, disc drive 100 can switch between heads 120 positioned at the same virtual track 234 without having to adjust their position, and therefore operate in cylinder mode.

Since each disc 106 of a disc drive 100 is mounted to spindle 104 after the servo sectors 202 have been written, the angular position of the index sectors 207 of the discs 106 will be misaligned. This can be taken into account by establishing the relative angular positions of the index sectors 207 for each disc 106 of disc drive 100 with respect to a reference location or index sector. This can be desirable to establish the proper timing for writing to the surfaces of discs 106 to avoid writing data in the wrong location within a virtual data track when switching between heads 120.

In summary, the present invention relates to repeatable runout (RRO) compensation of servo control systems used in disc drives 100 and spin-stands 130. One embodiment of the invention is directed toward a servo control loop 236 that includes compensation circuitry 238 having a compensation signal that is generated based upon a compensation equation. The compensation signal represents RRO caused by eccentricity between pre-written servo tracks 220 and an axis of rotation 232 of a disc 106 on which they are written. The compensation signal is injected into the servo control loop 236 to compensate the RRO.

Another embodiment of the invention is directed toward a method of compensating RRO in a servo control loop 236 that is related to eccentricity between pre-written servo tracks 204 on a disc 106 and a path 228 followed by a head 120 that is concentric with an axis of rotation 232 of the disc 106. In the method, shown in FIG. 9, a compensation equation is formed that represents the RRO (step 244). A compensation signal is generated based upon the compensation signal (step 246). The compensation signal is injected into the servo control loop 232 to cancel the RRO and cause the head 120 to follow a virtual track 234 that is concentric with the axis of rotation 232 of a disc 106 (step 248).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the various embodiments of the invention while maintaining substantially the same functionality without departing from the scope and spirit of the present invention. Furthermore, additional features and benefits will be made apparent in view of the figures.

What is claimed is:

1. A method comprising steps of:
   forming compensation equations for a plurality of servo tracks of a plurality of discs, each compensation equation including discrete compensation values representing repeatable runout (RRO) for one of the servo tracks of one of the discs;
   using the compensation equations to control heads corresponding to the discs to follow virtual tracks that are substantially concentric to an axis of rotation of the corresponding disc;
   measuring a reference position of each head while maintaining the heads in fixed relation to each other;
   establishing a reference virtual track at each of the reference positions; and
   identifying each of the virtual tracks of each disc based upon their position relative to the reference position, whereby the disc drive is operable in a cylinder mode.

2. The method of claim 1, wherein the forming step comprises:
   positioning a head at a fixed radial position relative to the axis of rotation of the corresponding disc;
   measuring a position error signal (PES) corresponding to a difference between a head position signal and a reference signal;
   setting the compensation values in accordance with the PES;
   forming the compensation equation for the disc using the compensation values; and
   repeating steps (a)(1) through (a)(4) for each disc.

3. The method of claim 2, wherein the compensation values relate to discrete radial position differences between the position of the head and a reference track as measured at each servo track.

4. A device comprising:
   a plurality of discs each having servo tracks that define data tracks that are eccentric to an axis of rotation;
   a plurality of transducers each configured to produce an output signal in response to the servo tracks of a corresponding disc;
   a reference position for each transducer, each reference position identifying a location relative to the corresponding disc that is obtained while the transducers are maintained in fixed relation to each other;
   a plurality of compensation equations for the servo tracks of the discs, each compensation equation including discrete compensation values representing repeatable runout (RRO) of one of the servo tracks of one of the discs caused by eccentricity between the servo track and an axis of rotation of the disc; and
   a servo control loop configured to control a position of each transducer to follow virtual tracks that are substantially concentric to the axis of rotation of the corresponding disc using the corresponding compensation equation, the virtual tracks of each disc are identified relative to the reference position of the corresponding transducer to thereby allow the device to operate in a cylinder mode.

5. The device of claim 4, wherein the device forms a disc drive.

6. The device of claim 4, wherein the device forms a spin stand.

7. A method of operating a disc drive comprising:
   establishing virtual tracks for a plurality of discs that are eccentric to servo tracks written to the discs;
   establishing a reference position for a plurality of heads, each of which correspond to one disc surface while maintaining the heads in fixed relation to each other; and identifying each of the virtual tracks of each disc based upon their position relative to the reference position, whereby the disc drive is operable in a cylinder mode.

8. The method of claim 7, wherein the establishing virtual tracks includes:

forming compensation equations representing repeatable runout (RRO) for the plurality of discs, wherein each compensation equation includes discrete compensation values which represent the RRO at a plurality of the servo tracks of each disc; and using the compensation equations to establish virtual tracks that are substantially concentric to an axis of rotation of the corresponding disc.

* * * * *